Jan. 21, 1958  C. S. ASHCRAFT  2,820,394
AIR-COOLED HEAT DEFLECTOR FOR PICTURE PROJECTOR ARC LAMP
Filed June 26, 1953  2 Sheets-Sheet 1
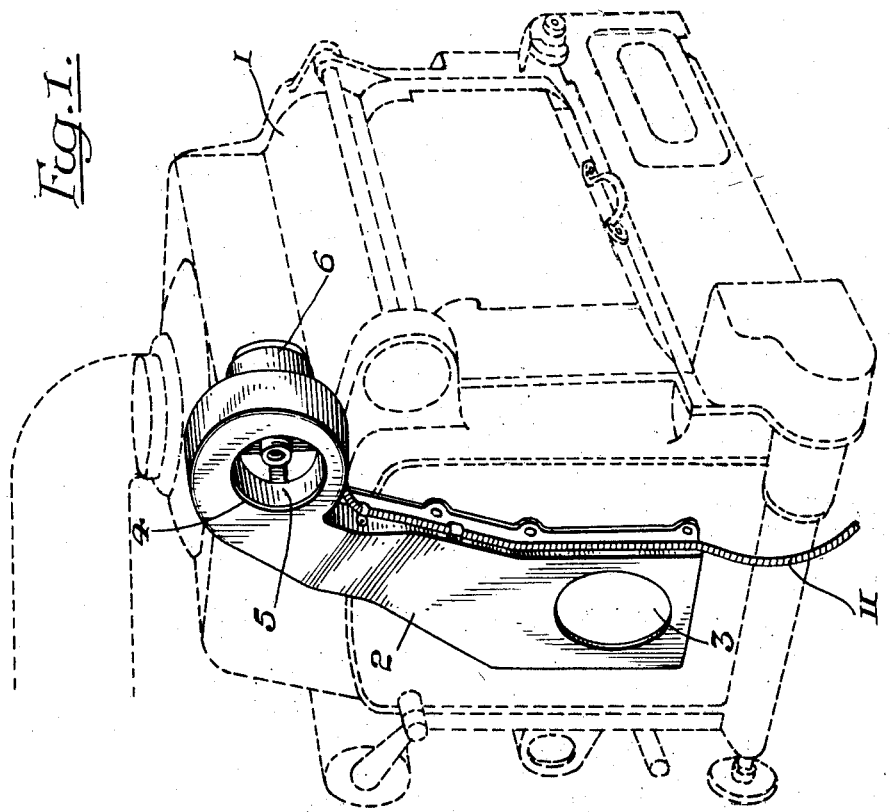
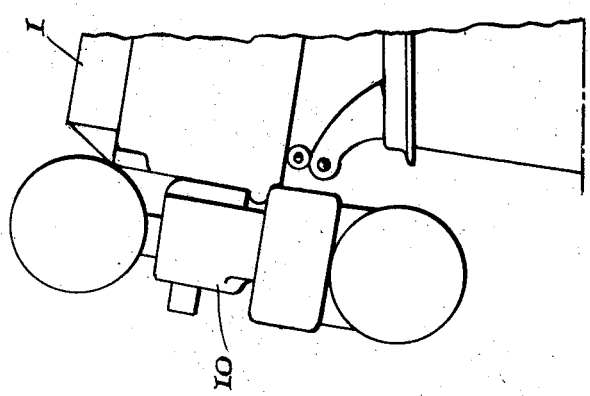
INVENTOR.
Clarence S. Ashcraft
BY Darby & Darby
ATTORNEYS.

Jan. 21, 1958 C. S. ASHCRAFT 2,820,394
AIR-COOLED HEAT DEFLECTOR FOR PICTURE PROJECTOR ARC LAMP
Filed June 26, 1953 2 Sheets-Sheet 2
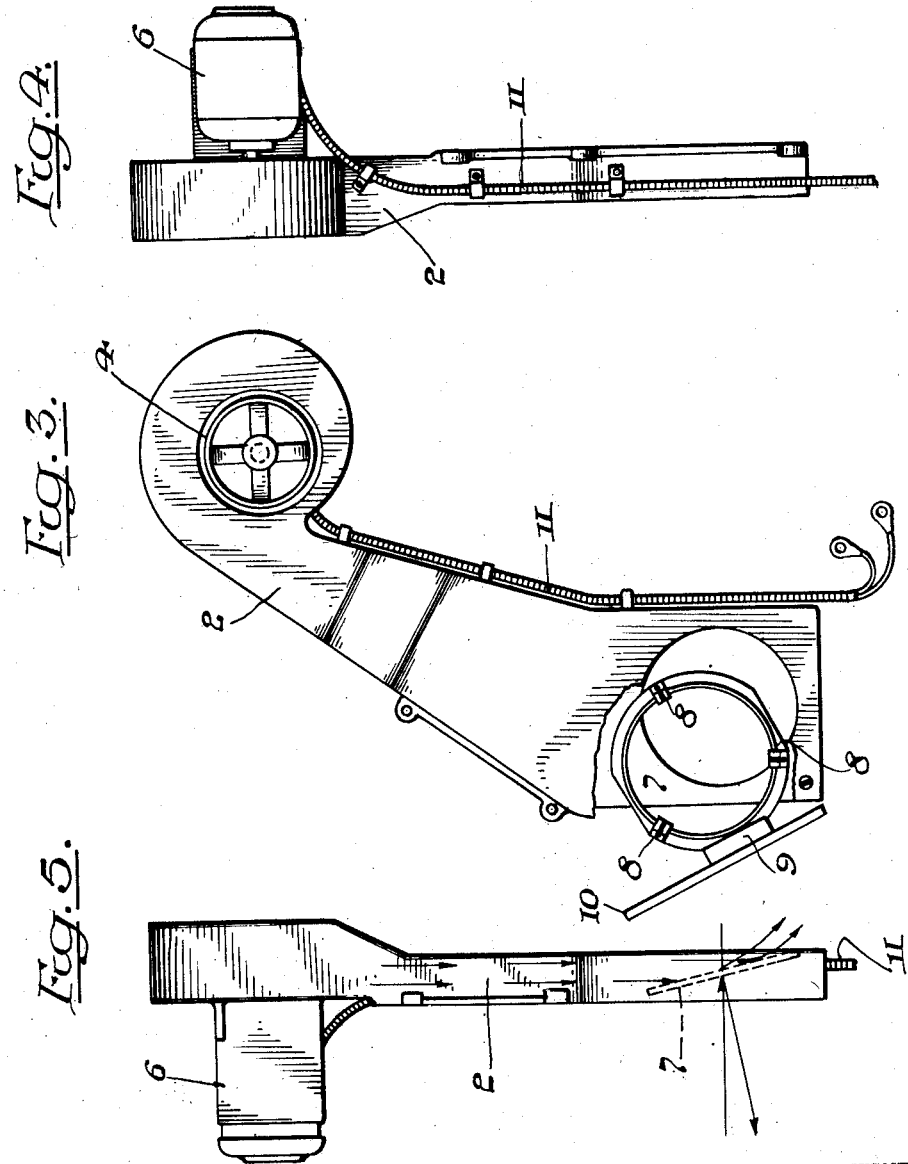
INVENTOR.
Clarence S. Ashcraft
BY Darby & Darby
ATTORNEYS

United States Patent Office 2,820,394
Patented Jan. 21, 1958

2,820,394

AIR-COOLED HEAT DEFLECTOR FOR PICTURE PROJECTOR ARC LAMP

Clarence S. Ashcraft, Manhasset, N. Y.

Application June 26, 1953, Serial No. 364,324

5 Claims. (Cl. 88—24)

My invention relates to arc lamps such as are used for motion picture projection, and has for an object to produce more usable light with less projected heat with such a lamp.

A feature of my invention is use of an air-cooled transparent heat deflector which permits projected light to pass with minimum loss while effecting maximum reduction in projected heat.

Another feature of my invention is the use of a heat-reflecting glass plate or disc mounted at an angle to the projected light.

Another feature of my invention is the use of a blast of air to cool the heat-reflecting glass plate or disc but avoiding disturbance of the arc by such air blast.

Another feature of my invention is the disposition of the heat reflecting glass disc at such an angle as to present a large area to the blast of air so that as much heat as possible is dissipated from the coated surface of the glass, thus preserving the coating.

Another feature of my invention is the elimination of glass in a motion picture projector when used with a projector lamp in accordance with my invention.

In the drawings,

Figure 1 is an elevation in perspective illustrating in broken lines, in outline a motion picture projector lamp as heretofore made, and in full lines, in outline, the addition of my invention thereto.

Figure 2 is an outline drawing of a motion picture projector lamp mounted on a base showing the relationship of a motion picture projector used therewith.

Figure 3 is a front view of the equipment which may be added to a motion picture projector lamp to produce my invention.

Figure 4 is a side view of the apparatus of Figure 3 looking from right to left at Figure 3, and Figure 5 is a side view of the apparatus of Figure 3 looking from left to right at Figure 3.

In the projection of motion pictures, great efforts have been made to produce a maximum amount of light for projection purposes. The reason for this is that a limiting factor in the number of seats which may be used in a motion picture theatre is the amount of light that can be produced and used in projecting the picture. As the cost of operating a motion picture theatre per seat goes down with the increase in number of seats, the margin for profitable operation in many cases depends upon the quantity of light which can be produced and used. With drive-in theatres this is of even greater impartance because the space per viewer is greater.

Motion picture projector lamps now used in the smallest commercial theatres up to the largest, are of the carbon arc type. This type has been found capable of producing more useful light than any other. Such lamps create a great deal of heat, requiring multiple horsepower blowers for ventilation in order to permit the presence of an operator and to permit the arc to operate without damage to the lamp itself.

A limiting factor in the amount of light that can be used is the amount that may be passed through a film without damage to the film.

There have been many previous attempts to increase the amount of usable light. Some of these have been prohibitively expensive and others have created secondary difficulties which limit their usefulness, or prohibit their use entirely.

Such previous attempts have included the use of heat-absorbing glass in the projected beam. The difficulty with this is that the light loss is almost equal to the heat loss, producing little, if any, net gain in the amount of usable light. It has also been attempted to use high pressure air streams on both sides of the film, but this has not been successful.

It has also been attempted to use heat-reflecting glass. Heat-reflecting glass is transparent glass or quartz coated with transparent layers of metals. These attempts have been unsuccessful because under the high temperatures the coated surfaces are unstable and very soon become brown at the center, cutting down the amount of light; and the heat reflected back on to the positive carbon of the arc lamp caused over-heating damage and actual melting of the metal parts.

With my invention I use reflecting glass, but overcome the difficulties mentioned.

It is also possible, by the use of my invention, to eliminate the glass which is usually used in the projector. In motion picture projection, a projector is placed in front of the lamp so that the beam from the lamp passes through the film as it is fed past the aperture in the projector through which the beam passes. An interrupting shutter is used in such a projector to interrupt the light beam 48 times per second in order to prevent flicker on the screen. Since the shutter has the effect of an electric fan and tends to blow air into, or suck air from, the motion picture projector lamp, it has heretofore been necessary to use in the projector a plate of glass in the path of the beam in order to prevent disturbance of the arc in the lamp caused by air circulated by the shutter. With my invention I have found it possible to eliminate the use of such glass in the projector, thereby increasing the amount of useful light by about 10 percent.

In the drawings, the same reference numerals refer to the same parts throughout.

In Figure 1, I have shown in broken lines, in outline, a motion picture projector lamp 1, such as is now used. Mounted on the front of such a lamp is the apparatus which I have invented to increase the amount of useful light which may be produced. This apparatus includes a duct 2 mounted on the front of the lamp and having therein an aperture 3. In the duct there is another aperture 4, within which is mounted a squirrel cage fan 5 driven by an electric motor 6. The fan drives a large quantity of air at high velocity downward through the duct. Within the aperture 3 is a heat-reflecting glass plate or disc 7, about five inches in diameter, which is held by spring clips 8 on a removable frame 9 having a closing plate 10 which makes the opening light and air-tight. The removable frame permits the heat-reflecting glass plate to be easily removed for cleaning, and easily replaced. This is important in operation. The heat-reflecting glass plate 7 is mounted at an angle of about 15 degrees to the light beam, as is best seen in Figure 5, so that the blast of air is deflected from the heat-reflecting glass plate to without the lamp housing. By mounting the heat-reflecting glass plate 7 at an angle the heat within the light beam is reflected downward within the lamp and not directly back on the arc, thus avoiding difficulties which have heretofore arisen with reflecting glass not mounted at an angle. The angle mounting also permits the blast of air from the fan 5 to be deflected so that it does not directly strike the arc, thus avoiding difficulty which has heretofore been encountered when an air stream struck the arc. The angle mounting also presents a larger surface of the glass to the blast of air, considerably increasing the cooling effect.

I have shown in Figure 2 the relationship between a motion picture projecting lamp and a projector 10. The projector is mounted so that the aperture across which the film passes is in the light beam from the lamp 1. It will be seen from the way these two pieces of apparatus are placed that the stream of air produced by the shutter within the motion picture projector would be in line with the carbon arc. It has heretofore been necessary to use within the projector a glass plate in the light beam in order to prevent this stream of air from passing out of the projector and hitting the carbon arc which is in line therewith. With the use of my new invention this glass in the projector may be eliminated, thus increasing the amount of useful light by an amount equal to or greater than the light lost by the use of the heat-reflecting glass plate 7.

By the use of my invention it is possible to use arc lamps of higher power which are considerably brighter than have heretofore been used. Such brighter arcs produce greater heat, but my invention permits the heat to be dissipated with a light loss of only some 5 or 6 percent. This light loss is more than made up for by elimination of the glass in the projector which caused a light loss of around 10 percent. It is therefore possible with my invention to get something like 30 percent more useful light through the film for the projection of motion pictures than has heretofore been obtained.

This is of great importance not only in large theatres, particularly drive-in types of theatres, but also with the larger screens now being used for panoramic and 3-dimensional motion picture projection.

It will be understood that my invention is capable of various modifications and I do not desire to be restricted to the particular form shown, but only within the scope of the appended claims.

What is claimed is:

1. A motion picture projection lamp, a duct mounted thereon, an aperture in said duct, a heat-reflecting transparent glass plate within said aperture, means for mounting said heat-reflecting glass plate within said aperture at an angle to the light beam, a second aperture within said duct, and a motor driven fan within said aperture for drawing air into the duct and blowing it through the duct onto said heat-reflecting glass plate and at an angle to the said heat-reflecting glass plate which directs the air away from the projection lamp.

2. In a projection lamp of the arc type, in combination, a lamp housing having a light beam aperture therein, a channel mounted on the front of said housing and forming with a portion of said housing a duct, said channel having an aperture in its front wall in alignment with the aperture in the lamp housing, said duct extending over said beam aperture in a direction perpendicular to the beam axis, the width of said duct being at least as great as the diameter of said aperture, the depth of said duct being materially less than the diameter of said aperture, a heat-reflecting light-transmitting plate mounted in said duct and extending at an angle to the light beam between the aperture in said duct and the aperture in said housing, whereby heat reflected by said plate is directed away from the arc and air passing over said plate is directed away from said lamp housing.

3. A device as claimed in claim 2, characterized in that the top of said plate contacts the rear wall of said duct and the bottom of said plate contacts the front wall of said duct whereby air after cooling said plate is directed away from the lamp housing.

4. In a projection lamp of the arc type, in combination, a lamp housing having a light beam aperture therein, a duct mounted on said housing, said duct having a light beam aperture in alignment with the aperture in the lamp housing, said duct extending over said light beam aperture in a direction perpendicular to the beam axis, the width of said duct being at least as great as the diameter of said light beam aperture, the depth of said duct being less than the diameter of said light beam aperture, a light-transmitting and heat-deflecting glass plate mounted in said duct and extending at an angle to the light beam in the light beam aperture in said duct, whereby heat reflected by said reflecting glass plate is directed away from the arc and air passing through said duct to said heat reflecting glass plate is directed away from said lamp housing.

5. A device as claimed in claim 4, characterized in that the top of said heat reflecting glass plate contacts the rear wall of said duct and the bottom of said heat reflecting glass plate contacts the front wall of said duct, whereby air after cooling said heat reflecting glass plate is directed away from the lamp housing.

References Cited in the file of this patent

UNITED STATES PATENTS

| | | |
|---|---|---|
| 1,342,894 | Bugbee | June 8, 1920 |
| 1,434,268 | Tillyer | Oct. 31, 1922 |
| 1,770,659 | Oehmichen | July 15, 1930 |
| 1,971,454 | Loomis | Aug. 28, 1934 |
| 2,029,871 | Johnson | Feb. 4, 1936 |
| 2,103,766 | Cahill | Dec. 28, 1937 |
| 2,147,801 | Scanlan | Feb. 21, 1939 |
| 2,246,583 | Griffin | June 24, 1941 |
| 2,279,084 | Tillyer | Apr. 7, 1942 |
| 2,316,224 | D'Elia | Apr. 13, 1943 |

FOREIGN PATENTS

| | | |
|---|---|---|
| 475,654 | Germany | Apr. 29, 1929 |
| 331,743 | Great Britain | July 10, 1930 |